United States Patent [19]

Van Laethem et al.

[11] Patent Number: 4,536,204
[45] Date of Patent: Aug. 20, 1985

[54] PROCESS FOR PRODUCING COATED FLAT GLASS

[75] Inventors: Robert Van Laethem, Loverval; Albert Van Cauter, Charleroi; Robert Terneu, Thiméon, all of Belgium

[73] Assignee: Glaverbel, Brussels, Belgium

[21] Appl. No.: 610,087

[22] Filed: May 9, 1984

[30] Foreign Application Priority Data

May 13, 1983 [GB] United Kingdom ............. 8313283

[51] Int. Cl.$^3$ ............................................. C03C 17/00
[52] U.S. Cl. ............................... 65/60.4; 65/60.3; 65/60.52; 65/95; 65/161; 65/118
[58] Field of Search ............ 65/60.3, 162, 60.4, 65/60.52, 118, 119, 161, 95, 350, 194, 99.2

[56] References Cited

U.S. PATENT DOCUMENTS 3,508,899 4/1970 Ward .................................. 65/119
4,414,015 11/1983 Van Laethem et al. ............. 65/60.3

FOREIGN PATENT DOCUMENTS 0025738 3/1981 European Pat. Off. .
2016444 9/1979 United Kingdom .

*Primary Examiner*—Arthur Kellogg
*Attorney, Agent, or Firm*—Spencer & Frank

[57] ABSTRACT

A metal or metal compound coating 6 is deposited on a face of a hot, freshly formed ribbon 1 of glass during the ribbon's forward travel through a coating station 5 between a forming installation 3 and an annealing lehr 4 by contacting the ribbon face with fluid coating precursor material e.g. sprayed from nozzle 17.

Preparatory to the coating step, the ribbon 1 is passed through successive thermal conditioning zones comprising a zone 19 in which temperature gradients across the ribbon are reduced and a following zone in which heat is supplied substantially entirely to a surface layer of the glass at the face to be coated by exposing that face to one or more radiant heaters 22 having a black body temperature below 1100° C. to compensate at least partially for the cooling effect of the coating step on the ribbon 1.

8 Claims, 1 Drawing Figure

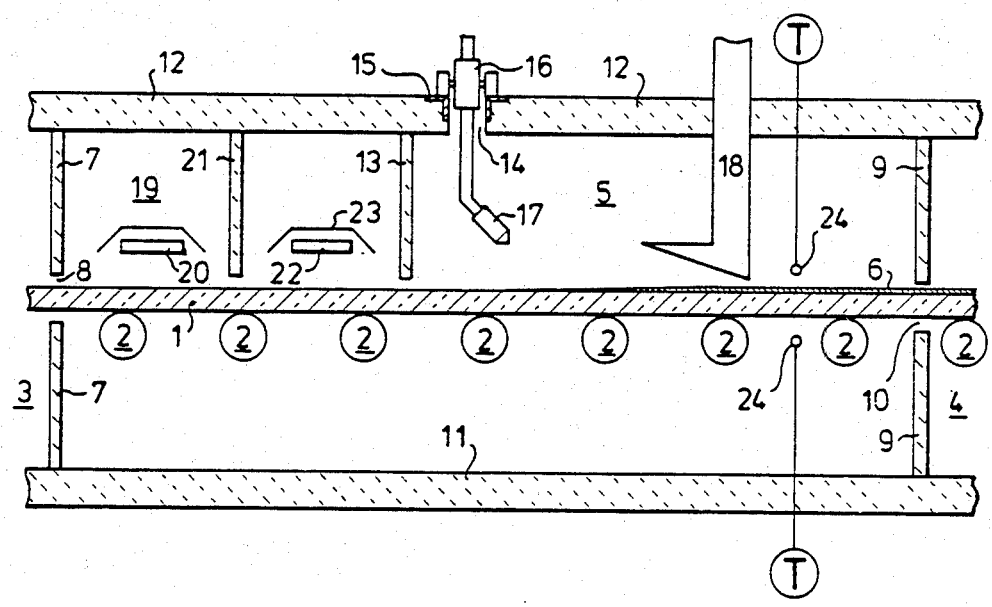

PROCESS FOR PRODUCING COATED FLAT GLASS

BACKGROUND OF THE INVENTION

This invention relates to a process for producing coated flat glass in which a metal or metal compound coating is deposited on a face of a freshly formed ribbon of hot glass during its forward travel from a flat glass forming installation to an annealing installation by contacting such face at a coating station with a fluid medium comprising one or more substances from which said coating is formed on said ribbon face.

The coating of glass is extensively practised for conferring desirable radiation absorbing and/or reflecting properties on the product with a view to its use for glazing purposes. Control of the coating step is very important for achieving a coating having those desired properties and which at the same time is of high and uniform optical quality.

It is known that the thickness and quality of the coating formed on the glass ribbon is influenced by the temperature conditions at the coating station or stations. A particularly important influential factor is the temperature of the glass at the position along the ribbon path where it is contacted by the fluid coating material, and the prior art literature contains various proposals for effecting a thermal conditioning of the glass preparatory to deposition of such medium.

Thus for example British patent specification No. GB 2 016 444A (Saint-Gobain Industries) proposes sweeping the ribbon to be coated with a flame in order to bring the glass to an appropriate temperature for the coating operation.

And because the side margins of the glass ribbon leaving the forming installation (for example a float tank) tend to cool more rapidly than the central portion the prior art includes processes wherein the glass is thermally conditioned by heating the ribbon more strongly, or only, at its side margins in order to reduce the temperature gradient across the ribbon prior to coating: see e.g. British patent application No. GB 2 078 710A (BFG Glassgroup) and European patent application No. 0 025 738 A1 (Saint-Gobain Vitrage).

In many industrial plants in which coated flat glass is produced, only a proportion of the formed flat glass is coated. Production has to be switched periodically from coated to uncoated glass or vice versa. The switch from one type of product to the other has proved to be quite time consuming. This is because the switch entails adjustments to the annealing installation if the annealing is to proceed in a satisfactory manner. The need for the adjustment of the annealing installation arises because of the cooling effect which is associated with the formation of a coating on the glass ribbon. It has even been found that adjustment to the annealing installation is sometimes required when switching from one type or thickness of coating to another whose formation has a different effect on the temperature of the glass.

SUMMARY OF THE INVENTION

It is an object of the present invention to facilitate production switches as above referred to.

It has been found that by appropriate selective heating of a relatively thin surface stratum of the glass ribbon at the side to be coated, the cooling effect of the coating operation can be at least partly compensated for. However, the formation of a coating of adequate uniformity over the width of the ribbon is dependent on reduction of the temperature gradients across the ribbon which naturally occur as it travels towards the coating station. If the surface stratum is heated non-uniformly to effect that reduction, the problem of troublesome annealing lehr adjustments associated with the aforesaid production switches remains.

According to the present invention, there is provided a process for producing coated flat glass in which a metal or metal compound coating is deposited on a face of a freshly formed ribbon of hot glass during its forward travel from a flat glass forming installation to an annealing installation by contacting such face at a coating station with a fluid medium comprising one or more substances from which said coating is formed on said ribbon face, characterised in that preparatory to the coating step the glass ribbon passes through successive thermal conditioning zones comprising a zone in which temperature gradients across the ribbon are reduced and a following zone in which heat is supplied entirely or substantially entirely to a surface layer of the glass at the side to be coated by exposing that side to one or more radiant heaters having a black body temperature below 1100° C. to compensate at least partially for the cooling effect of the coating step.

The invention affords a combination of advantages. The radiant heat emitted by a radiator having a black body temperature below 1100° C. is strongly absorbed by the glass and, in consequence, substantially all of the incident radiant energy becomes absorbed by a thin surface layer of the ribbon. The effect of this surface heating in combination with the cooling effect of the coating material supplied at the coating station is that the temperature profile through the thickness of the ribbon on reaching the annealing installation is closer to what it would be in the absence of the surface heating and coating steps. Consequently when it is desired to modify the composition or thickness of the coating, or when it is desired to terminate coating of the glass ribbon, if this is done by terminating the supply of the coating material and switching off the surface heater(s), the annealing installation needs no or only minor adjustment. Because the transverse temperature gradients which exist across the ribbon leaving the forming installation are reduced in a distinct thermal conditioning zone preceding that in which the surface heating occurs the thermal conditioning treatment in that preceding zone will remain unchanged when a production change of the above type is effected.

The present invention can be performed so as substantially to eliminate any difference between the mean temperatures of the two faces of the ribbon after coating and before annealing. It is to be noted that significant differences between the mean temperatures of the upper and lower faces of the ribbon at the start of annealing can lead to arching or dishing of the ribbon on cooling.

Because the heat energy supplied for compensating for the cooling effect of the coating operation is substantially entirely absorbed in a surface layer of the glass ribbon, the glass ribbon surfaces can, if so required, be heated to a higher temperature than would be possible, without risk of sagging of the ribbon, if it were heated to the same extent through its entire thickness.

Because glass is not a good conductor of heat, heat transfer from the heated surface layer to lower strata of the glass will not occur to any material extent in the time available between the surface heating and the application of the coating material. It is obviously desirable to locate the radiant heater(s) responsible for the surface heating as close as possible to the coating station.

It is to be understood that the surface heating need not be uniform across the width of the ribbon. The heat energy supplied can be distributed non-uniformly if required to compensate for any non-uniform cooling effect of the coating step, as hereafter referred to.

It is also to be understood that the heat imparted to the ribbon by the surface heating may in fact be in excess of the amount of heat lost in the coating step, provided that the temperature profile through the thickness of the ribbon on reaching the annealing installation is closer to that of an uncoated ribbon than to that of a similarly coated ribbon in the absence of such surface heating.

It will be appreciated that the first thermal conditioning zone in which temperature gradients across the ribbon are reduced may rely on differential heating of the ribbon across its width or on a well-insulated chamber of sufficient length that such gradients are reduced by thermal conduction within the ribbon.

Preferably, the temperature of the coated surface of the ribbon is monitored after coating and said radiant heater(s) is (or are) controlled so that the coated face complies with predetermined temperature conditions. For example the temperature of the coated face of the ribbon can be compared with a previously monitored temperature of the corresponding face of an uncoated ribbon passing along the same path and the radiant heating means can be controlled to minimise the difference between such temperatures.

Advantageously the temperatures of opposite points on both surfaces of the ribbon are monitored after coating and said radiant heater(s) is (or are) controlled in dependence upon any difference between such temperatures. In this way the temperature difference if any between the faces of the coated ribbon can be brought to a level corresponding to a previously monitored temperature difference, if any, between the faces of an uncoated ribbon. It has been found that, provided the ribbon temperature is high enough for annealing to take place, the temperature distribution within the ribbon is as important for governing annealing conditions as is the actual temperature.

Reference has been made to the transverse temperature gradient across the ribbon width. In particular, the margins of the ribbon will in general be at a lower temperature than its centre due to cooling from the side walls of the passageway between the forming and annealing installations. In order to achieve a uniform coating across the full width of the ribbon it is desirable that the temperature of the face to be coated should be substantially uniform across the ribbon width so that the reactions taking place during coating can proceed at a uniform rate. It is accordingly preferred that the ribbon face to be coated is differentially heated across its width, preferably so that the temperature across its width does not vary by an amount in excess of 15° C. Such differential heating can best be effected by heating means additional to said radiant heater(s), though the latter may, if desired, be arranged to effect differential heating.

The ribbon face to be coated is preferably heated to a mean temperature in the range 570° C. to 630° C.

BRIEF DESCRIPTION OF THE DRAWINGS

A preferred embodiment of the invention will now be described by way of example with reference to the sole FIGURE of the drawings which shows an apparatus for implementing the process according to the invention.

DESCRIPTION OF THE PREFERRED EMBODIMENT

In the FIGURE, a ribbon of hot glass 1 is conveyed by rolls 2 from a ribbon-forming machine 3, for example a float tank, to a horizontal annealing lehr 4 via a coating station 5 where a coating 6 is applied to the upper surface of the glass ribbon 1. The end of the ribbon-forming machine 3 is defined by partitions 7 separated by a horizontal slot 8 for the egress of the ribbon while the start of the annealing lehr is closed off by partitions 9 again separated by a slot 10 for the passage of the ribbon. The space between the end of the ribbon-forming machine 3 and the start of the annealing lehr 4 is closed off by sole and roof walls 11, 12 and by side walls (not shown) which define a tunnel. Depending from the roof wall 12 is a curtain wall 13 which defines the start of the coating station 5. At the coating station 5, the roof wall 12 is provided with a slot 14 bounded by a track 15 supporting a carriage 16 which bears a spray head 17 in a manner so that the spray head can be caused to move to and fro across the path of the ribbon 1 to spray coating precursor material onto the glass. Reaction products are aspirated at the downstream end of the coating station 5 by means of an exhaust duct 18.

A thermal conditioning zone 19 containing heating means 20 is located downstream of the partition 7 for differentially heating the ribbon 1 across its width so as to reduce transverse temperature gradients in the ribbon. Radiant heating means 22 is provided above the ribbon immediately upstream of the curtain wall 13 at the start of the coating station 5, and this heating means is maintained during production of coated glass at a black body temperature below 1100° C. A reflector 23 is provided above the radiant heating means 22 so that radiation therefrom is substantially confined to an increment of the length of the ribbon path. The maximum permissible length of the irradiated increment of the ribbon path will depend upon the ribbon speed. For example, in a float glass production plant where the glass ribbon is drawn off at 12 m/min., in order that the glass should be heated for less than 10 seconds, that increment must not exceed 2 meters in length. If desired, the heating could be confined to a given increment of the length of the ribbon path by placing a second, optional curtain wall 21, like the curtain wall 13, upstream of the radiant heating means 22. Control of heating can be effected by raising or lowering the radiant heating means 22, or by controlling the flow of fuel or electricity as appropriate. If desired, one or more further heating means extending across over the ribbon path may be provided, and additional control may be effected by the switching on or off of selected heaters.

Furthermore, the radiant heating means 22, or any further heating means provided, may comprise a plurality of individual heaters each leading across an increment of the width of the ribbon path, so that the upper surface of the ribbon may be heated differentially across its width.

Control of the heating means is greatly facilitated when the temperature of the glass ribbon is monitored downstream of the coating station 5, near the entrance to the annealing lehr 4. To this end, at least one pair of pyrometers 24 is located at that region, with one pyrometer being arranged vertically above the other, and with one pyrometer being positioned above and one below the ribbon, so as to monitor the temperature of opposite regions on the two ribbon surfaces. Where the heating means is divided across the width of the ribbon path for differential heating of different increments of the ribbon width, one pair or pyrometers should desirably be provided for each such width increment.

In one specific practical embodiment, the plant is set to produce uncoated glass of a particular thickness and thus at a particular ribbon speed, and annealing conditions in the lehr 4 are settled in the usual way. The temperatures of the upper and lower surfaces of at least one increment of the width of the ribbon are monitored as the ribbon enters the lehr. In order to produce coated glass, the coating apparatus is activated and the heating means 20,22 are switched on. The radiant heating means 22 is then controlled in dependence on the continuously monitored ribbon surface temperatures so that the temperature gradient through the thickness of the coated ribbon differs as little as possible from that of the uncoated ribbon.

We claim:

1. A process for producing flat glass coated on one side with a coating comprised of one of a metal and a metal compound, wherein the glass is formed in a flat glass forming installation and subsequently annealed in an annealing installation, said process comprising:
    advancing a freshly formed ribbon of hot flat glass from the flat glass forming installation to the annealing installation;
    passing the ribbon through a first thermal conditioning zone located downstream of the glass forming installation for reducing temperature gradients across the ribbon;
    passing the ribbon through a second thermal conditioning zone located downstream of the first thermal conditioning zone for supplying heat substantially entirely to a surface layer of the glass at the one side to be coated;
    contacting the one side of the advancing glass with a fluid medium which includes substances from which the coating is formed, said contacting step being performed at a coating station located between the second thermal conditioning zone and the annealing installation and having a cooling effect upon the advancing ribbon; and wherein
    said step of passing the ribbon through the second thermal conditioning zone includes supplying the heat with the use of at least one radiant heater having a black body temperature below 1100° C. to compensate at least partially for the cooling effect of said contacting step, and
    said process further comprises monitoring the temperature of the ribbon surface at the coated side after said contacting step; and controlling the at least one radiant heater so that the coated side complies with predetermined temperature conditions prior to entering the annealing installation.

2. A process according to claim 1, wherein at least one of said passing steps includes differentially heating the one side of the ribbon across its width.

3. A process according to claim 1, wherein said passing steps include heating the one side of the ribbon so that the temperature across the width of the one side before said contacting step does not vary by an amount in excess of 15° C.

4. A process according to claim 1, wherein said passing steps include heating the surface of the one side of the ribbon to a mean temperature in the range of 570° to 630° C. before said contacting step.

5. A process for producing flat glass coated on one side with a coating comprised of one of a metal and a metal compound, wherein the glass is formed in a flat glass forming installation and subsequently annealed in an annealing installation, said process comprising:
    advancing a freshly formed ribbon of hot flat glass from the flat glass forming installation to the annealing installation;
    passing the ribbon through a first thermal conditioning zone located downstream of the glass forming installation for reducing temperature gradients across the ribbon;
    passing the ribbon through a second thermal conditioning zone located downstream of the first thermal conditioning zone for supplying heat substantially entirely to a surface layer of the glass at the one side to be coated;
    contacting the one side of the advancing glass with a fluid medium which includes substances from which the coating is formed, said contacting step being performed at a coating station located between the second thermal conditioning zone and the annealing installation and having a cooling effect upon the advancing ribbon; and wherein
    said step of passing the ribbon through the second thermal conditioning zone includes supplying the heat with the use of at least one radiant heater having a black body temperature below 1100° C. to compensate at least partially for the cooling effect of said contacting step, and
    said process further comprises monitoring the temperature of opposite points on the respective surfaces of the ribbon after said contacting step; and controlling the at least one radiant heater in dependence upon any difference between the temperatures of such opposite points.

6. A process according to claim 5, wherein at least one of said passing steps includes differentially heating the one side of the ribbon across its width.

7. A process according to claim 5, wherein said passing steps include heating the one side of the ribbon so that the temperature across the width of the one side before said contacting step does not vary by an amount in excess of 15° C.

8. A process according to claim 5, wherein said passing steps include heating the surface of the one side of the ribbon to a mean temperature in the range of 570° to 630° C. before said contacting step.

* * * * *